June 26, 1951     J. S. SENEY     2,558,392
MOISTURE INDICATOR FOR WEBS

Original Filed Oct. 8, 1946     5 Sheets-Sheet 1

INVENTOR.
John S. Seney
BY
ATTORNEY

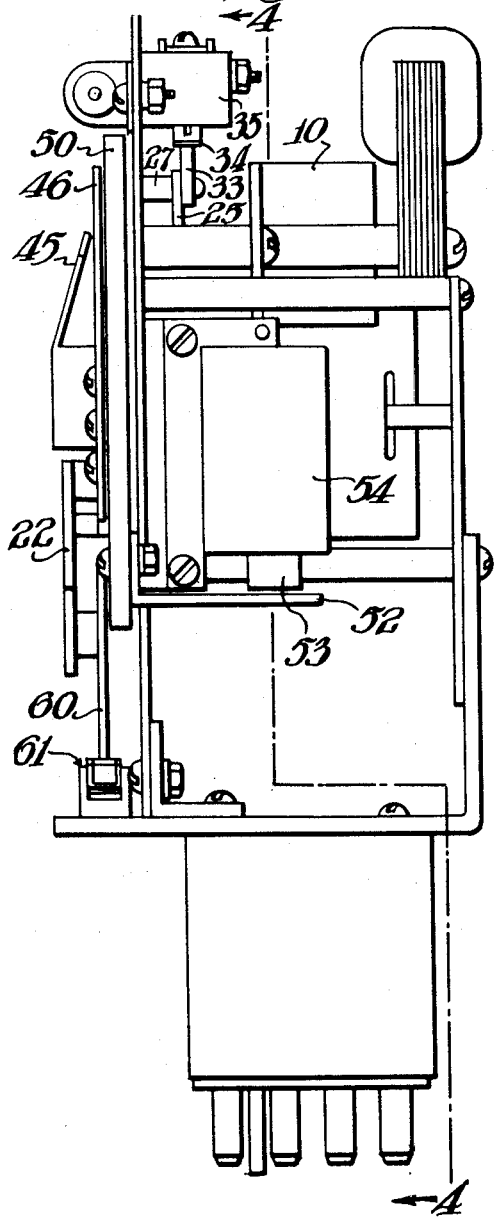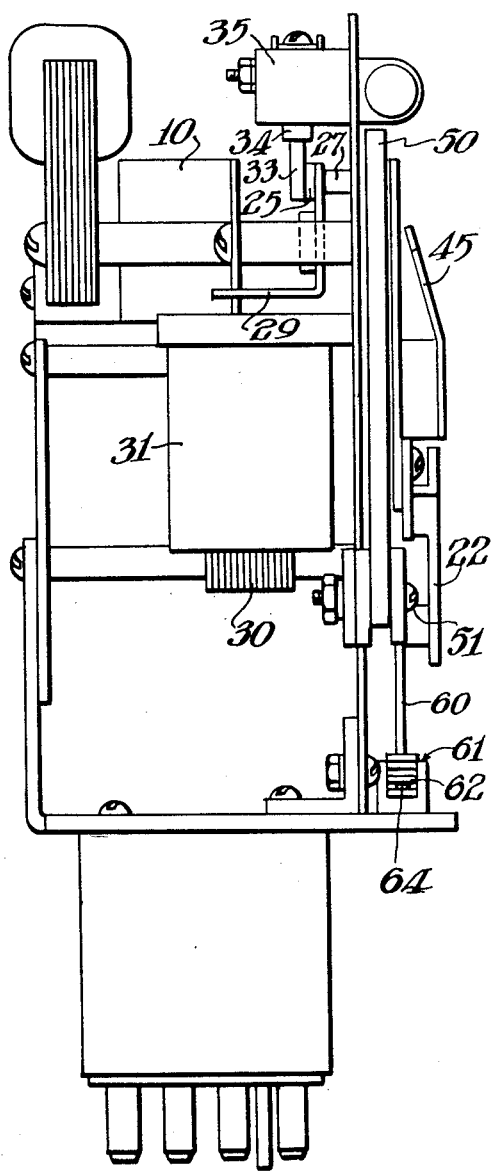

June 26, 1951 J. S. SENEY 2,558,392
MOISTURE INDICATOR FOR WEBS
Original Filed Oct. 8, 1946 5 Sheets-Sheet 3

INVENTOR.
John S. Seney
BY
C. H. Mortenson
ATTORNEY

June 26, 1951  J. S. SENEY  2,558,392
MOISTURE INDICATOR FOR WEBS

Original Filed Oct. 8, 1946  5 Sheets—Sheet 4

INVENTOR.
John S. Seney
BY
C. H. Mortimer
ATTORNEY

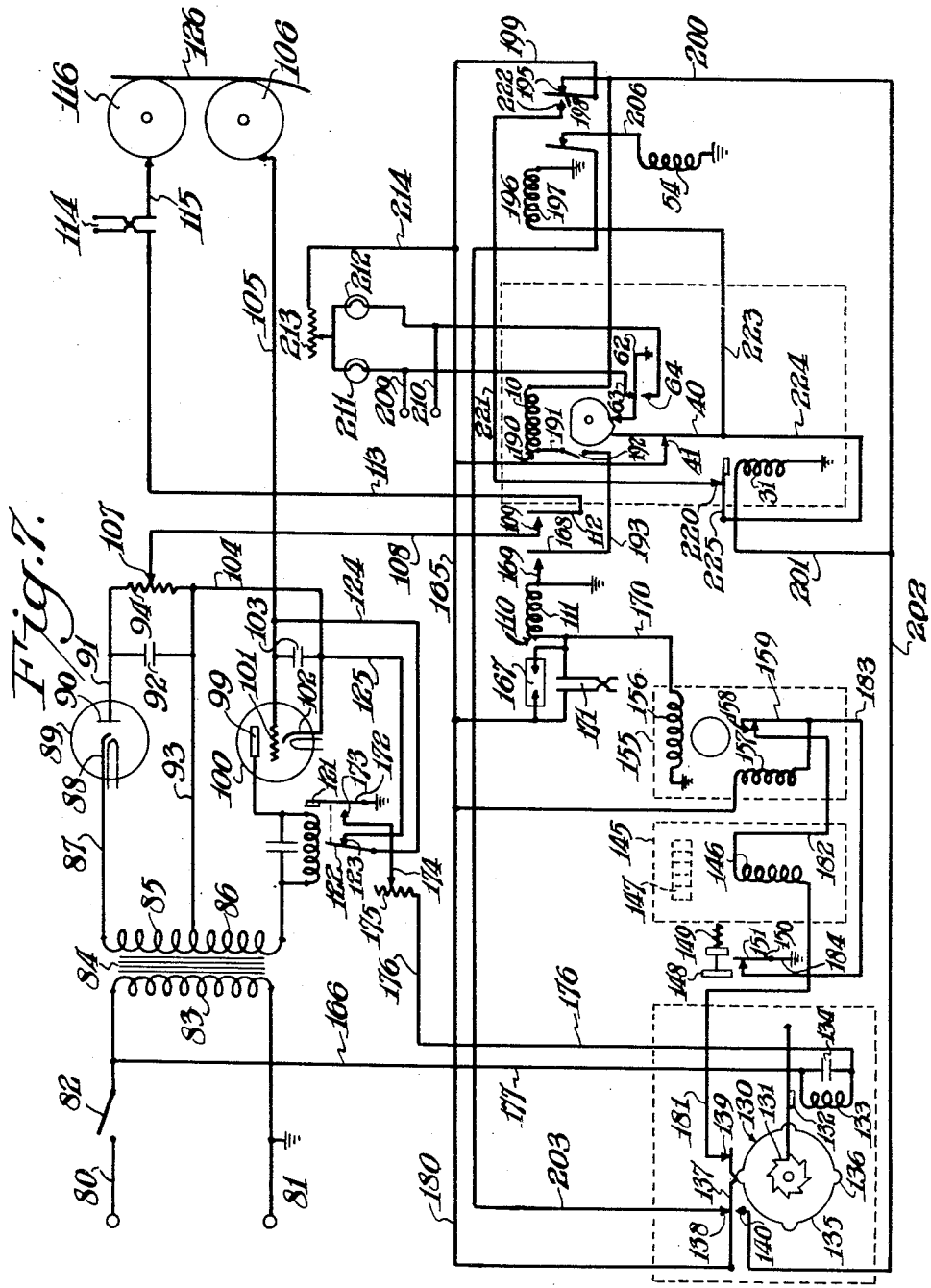

Patented June 26, 1951

2,558,392

UNITED STATES PATENT OFFICE 2,558,392

MOISTURE INDICATOR FOR WEBS

John S. Seney, Richmond, Va., assignor to E. I. du Pont de Nemours & Company, Wilmington, Del., a corporation of Delaware Original application October 8, 1946, Serial No. 701,954, now Patent No. 2,508,045, dated May 16, 1950. Divided and this application May 14, 1949, Serial No. 93,321

3 Claims. (Cl. 161—1)

This invention relates to moisture indicators for traveling webs, and more particularly to a device for measuring and integrating the total moisture content of each run over a predetermined period of time, and, in addition, for indicating the instantaneous moisture content at all times during the run. The invention is applicable to slashers or to webs of cellulosic materials, the moisture content of which is to be controlled.

This is a division of my copending application Serial No. 701,954, filed October 8, 1946, now U. S. Patent No. 2,508,045, dated May 16, 1950.

An object of the invention is to provide a timer for use with a device of the above type which may be readily installed and operated on commercial slashers or the like.

Another object is to provide a timer for use with an electrical measuring device of the above type which is responsive to the electrical resistance of the web.

Another object is to provide a timer for use with a device of the above type which measures both the instantaneous resistance and the average resistance over a period of time.

Another object is to provide a timer for use with a device of the above type which does not require special operating skill for its use.

Various other objects and advantages will be apparent as the nature of the invention is more fully disclosed.

In accordance with the present invention, a continuous measurement is made of the electrical resistance of a portion of the web, such as the thread sheet of the slasher, which in turn is a function of its moisture content. For this purpose, the entire thread sheet of the slasher is passed between a pair of stainless steel rolls located behind the last drier can. The rolls are connected in an electrical circuit with a condenser which is successively charged and discharged at a rate dependent upon the electrical resistance of the portion of the thread sheet extending between the rolls. An electrical counter means is provided for counting the number of times the condenser is charged and discharged during a predetermined period of time, this number representing a measure of the total moisture content. Means is also provided for measuring the charging time of the condenser and indicating the same on a suitable scale which is graduated directly to read moisture content. Means may also be provided to actuate a signalling or control device when the variation in moisture content exceeds predetermined limits.

Although the novel features which are believed to be characteristic of this invention are pointed out more particularly in the claims appended hereto, the nature of the invention will be better understood by referring to the following description, taken in connection with the accompanying drawings in which a specific embodiment thereof has been set forth for purposes of illustration.

In the drawings:

Figure 2 is an end elevation taken from the right hand side of Figure 1;

Figure 3 is an end elevation taken from the left hand side of Figure 1;

Figure 7 is a schematic diagram showing the electrical circuits involved.

Figure 1:
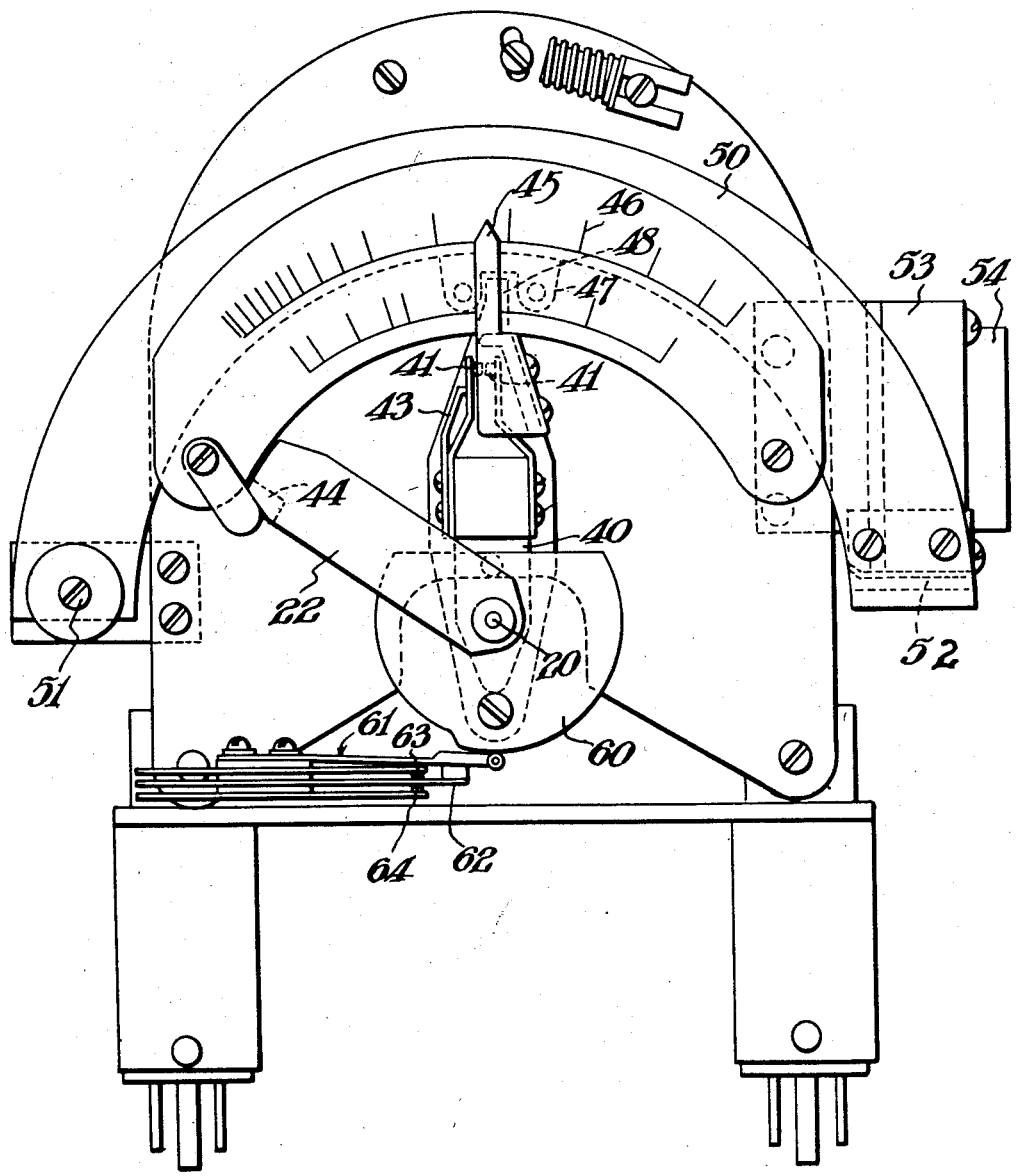
Figure 1 is a front elevation of the moisture indicating instrument.

Referring first to Figures 1 to 6, the electrical timing instrument is shown as comprising an electric clock motor 10 driving a gear 11 which is connected to a gear 12 forming one side of a differential. The gears 11 and 12 are journalled for free rotation on a shaft 13. A gear 14 journalled on the shaft 13 constitutes the other side of the differential and carries a drum 15 which is engaged by a brake 16 to prevent the drum 15 and gear 14 from turning. The differential cage comprises a pinion 17 meshing with the gears 12 and 14 and carried on a shaft 18 which is pinned to the shaft 13 to drive the same. The shaft 13 drives a shaft 20 through a gear train 21. The shaft 20 carries a driving arm 22 and is provided with a spring 23 which resets the driving arm 22 to zero position when the brake 16 is released.

With the brake 16 engaging the drum 15 to lock the gear 14 against turning, the motor 10 drives gear 12 and pinion 17 which rotates about the stationary gear 14 and drives the shaft 13 which, in turn, through the gear train 21, drives the arm 22. The arm 22 continues to be driven while the brake 16 is in locked position. When the brake 16 is released, however, the gear 14 is free to rotate as an idler gear and is driven by the pinion 17 without causing the latter to rotate about the periphery thereof. Hence, the shaft 13 is no longer driven by the pinion 17 but is free to rotate, and may be rotated in the opposite direction by the spring 23 to return the arm 22 to its zero position.

Figure 4:
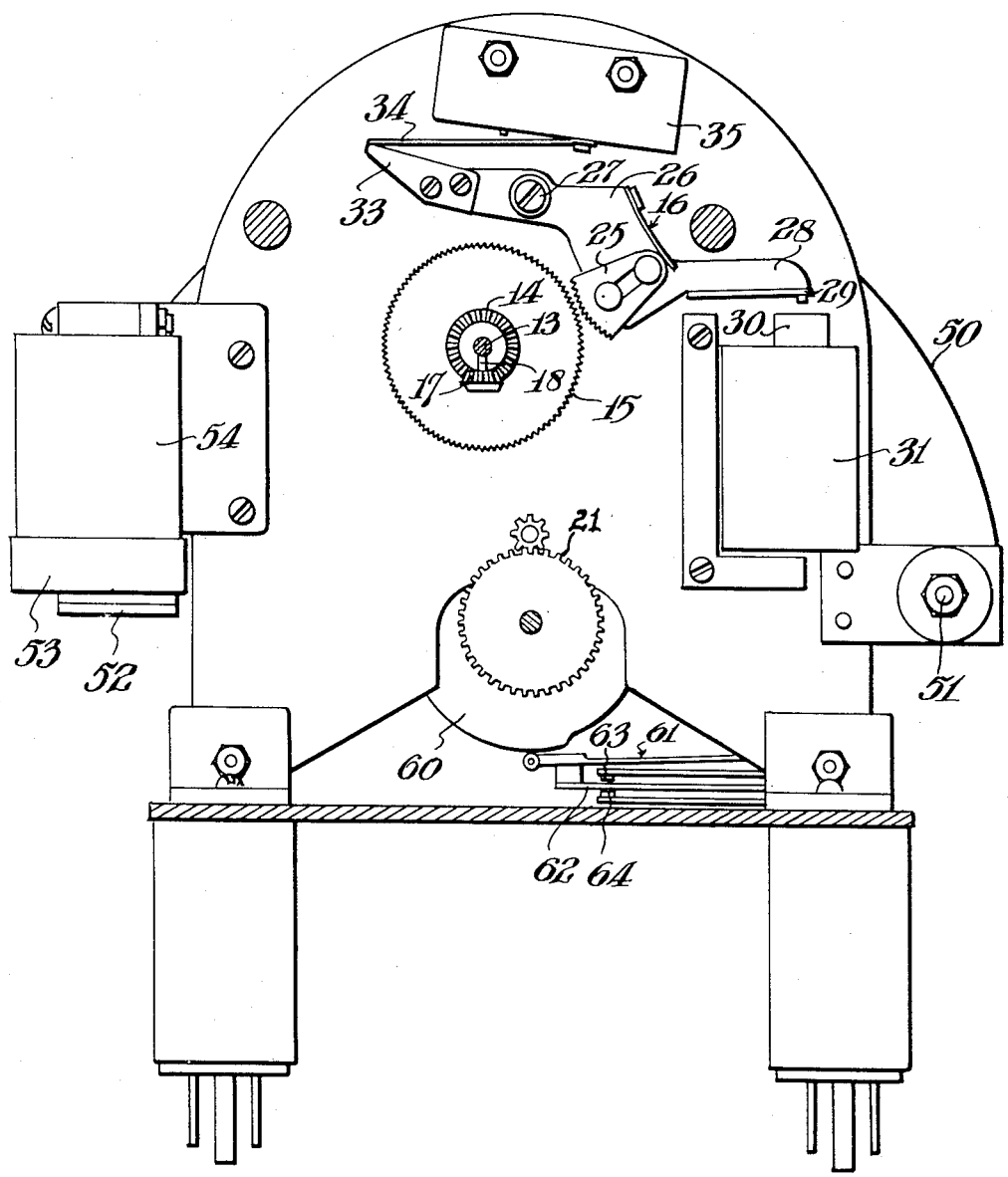
Figure 4 is a section taken on the line 4—4 of Figure 2.
Figure 5:
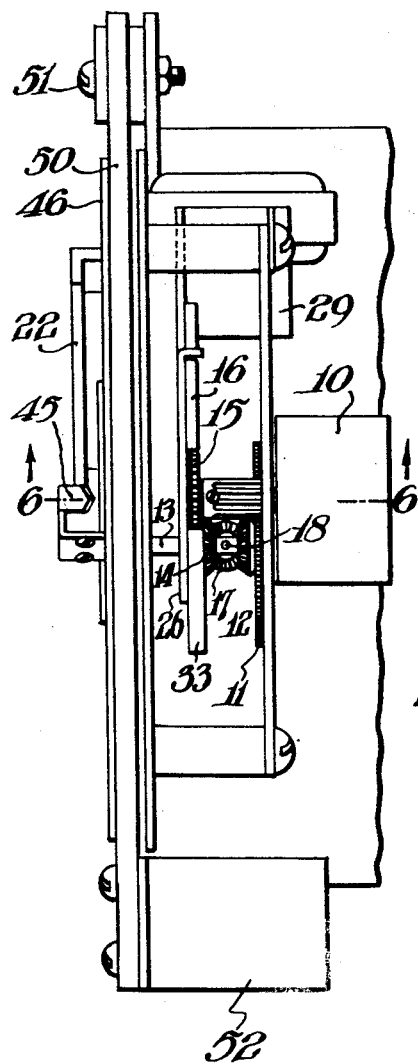
Figure 5 is a top plan view of the instrument.
Figure 6:
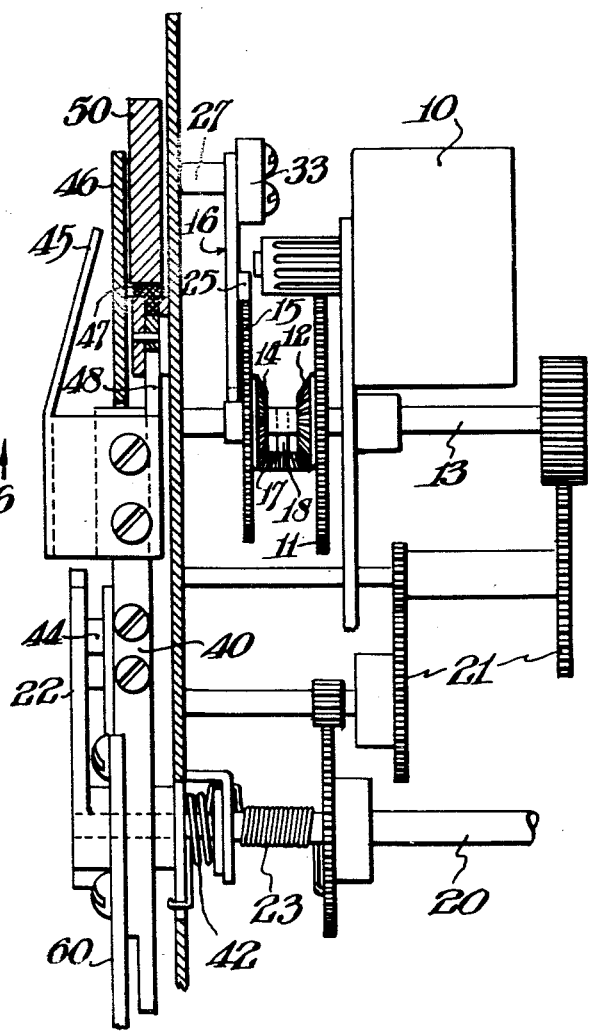
Figure 6 is a vertical section taken on the line 6—6 of Figure 5.

The brake 16, as shown in Figure 4, comprises a brake shoe 25 which engages the drum 15 and is mounted upon an arm 26, pivoted on a pin 27. The arm 26 carries a bracket 28 to which an armature 29 is attached. The armature 29 is associated with the magnetic circuit of an electromagnet 30 having a winding 31 which is arranged to attract the armature 29 and set the brake shoe 25 against the drum 15 when the electromagnet 30 is energized.

The arm 26 also carries a finger 33 which engages the operating lever 34 of a microswitch 35 in a manner to close the switch contact when the electromagnet 30 is deenergized and the finger 33 is retracted to the position shown, but to open the microswitch contact when the electromagnet 30 is energized to set the brake shoe 25 against the drum 15 and to cause the arm 26 to pivot about the pin 27 so that the finger 33 presses upwardly against the switch lever 34. The purpose of the switch 35 will be explained in connection with Figure 7.

A contact arm 40 (Figures 1 and 6) carrying a pair of contacts 41 is journalled about the shaft 20 and is normally urged to zero position by a spring 42. A member 43 acts as a stop to limit the opening of the contacts 41. A lip 44 carried by the driving arm 22 engages one side of the contacts 41, which closes the contacts 41 when the driving arm 22 reaches a position to register with the contact arm 40. The contact arm 40 carries a pointer 45 registering with a dial 46 which may be marked to read directly in percentage moisture content. The arm 40 also carries a bracket 48 to which a brake member 47 is attached. The brake member 47 engages an arcuate brake shoe 50 which is pivoted at 51 at one end and, at its other end, carries an armature 52 (Figures 1 and 2) which forms a part of the magnetic circuit of an electromagnet 53 having a winding 54. When energized, the electromagnet 53 attracts the armature 52 and raises the brake shoe 50 from the brake member 47, thereby allowing the spring 42 to turn the arm 40 to the left until it engages the driving arm 22 or reaches its zero position. With the electromagnet 53 deenergized, the brake shoe 50 rests upon the brake member 47 and exerts sufficient friction to prevent the arm 40 from being returned due to the action of the spring 42. The drag exerted by the brake shoe 50 is insufficient, however, to prevent the arm 40 from being driven in a clockwise direction, as seen in Figure 1, by the driving arm 22. The arm 40 is thus retained in its driven position by the brake shoe 50 when the driving arm 22 is reset to zero.

The arm 40 also carries a cam 60 (Figures 1 and 2) which is set to actuate a double throw switch 61 having an arm 62 and contacts 63 and 64 which are selectively closed in accordance with the position of the arm 62. The contacts 63 and 64 are actuated in accordance with the position of the contact arm 40 and are arranged to be selectively closed when the position of the arm 40 represents an excessive moisture variation.

Referring to Figure 7, the electrical system is shown as supplied from a power source including lines 80 and 81 and controlled by a switch 82. The lines 80 and 81 are connected to the primary 83 of a transformer 84 having a pair of secondary sections 85 and 86. One end of the secondary 85 is connected by a line 87 to the cathode 88 of a space discharge rectifier tube 89, the anode 90 of which is connected by a line 91 to a condenser 92, thence by a line 93 to the common point of the secondary sections 85 and 86. A potentiometer 94 is connected across the condenser 92. The tube 89 constitutes a rectifier which is arranged to cause a unidirectional current flow through the potentiometer 94 to develop a potential drop thereacross. The condenser 92 serves to smooth out the voltage variations and produce a substantially uniform potential drop across the potentiometer.

The secondary section 86 is connected to a condenser 98 and thence to the anode 99 of a space discharge tube 100, which may be of the Pliotron type, and is provided with a grid 101 and a cathode 102. A condenser 103 is connected between the grid 101 and cathode 102. The cathode side of the condenser 103 is connected by a line 104 to the return line 93. The grid side of the condenser 103 is connected by a line 105 to a slasher roller 106. The variable tap 107 of the potentiometer 94 is connected by a line 108 to a contact 109 of a relay 110 having an energizing coil 111. An arm 112 which cooperates with the contact 109 is connected by a lead 113 to one side of a jack 114, the other side of which is connected by a line 115 to a second slasher roll 116. The slasher rolls 106 and 116 are positioned beyond the last drier can of the slasher and are so arranged that the entire thread sheet is passed between the two rolls so that a circuit is established between the rolls due to the conductivity of the intervening portion of the thread sheet.

A relay coil 120 is connected across the condenser 98. The coil 120 actuates an armature 121 which, in turn, actuates an arm 122 which is normally closed against a contact 123. The arm 122 and contact 123 are connected by lines 124 and 125 respectively across the condenser 103.

In the operation of the circuit thus far described, a potential is applied from the tap 107 of the potentiometer 94, through contact 109 and arm 112 (when closed) and through jack 114 to the roll 116, thence through the slasher thread 126 to the roll 106 and through line 105 to condenser 103. The other side of condenser 103 is connected to the potentiometer 94 by line 104, thus completing the condenser-charging circuit. Current flowing from the secondary 86, through tube 100 and the coil 120, holds the contact 123 open. The condenser 103 continuously charges in a direction to make the grid 101 of the tube 100 negative. When the charge on the condenser 103 reaches a value such that the grid 101 is biased to its cut-off point, the tube 100 becomes non-conductive, thereby interrupting the current flow through the relay winding 120 and releasing the armature 121. This closes the contact 123 and short-circuits the condenser 103 to drain the negative charge therefrom and allow the grid 101 to return to its normal potential. The tube 100 thereupon again becomes conducting and the cycle is repeated. The condenser 103 repeatedly charges to the cut-off voltage and is discharged by the de-energization of the relay coil 120 in a cycle, the frequency of which is dependent upon the rate of charge of the condenser 103.

It will be noted that the rate at which the condenser 103 charges is dependent upon the resistance of the thread sheet between the rolls 106 and 116 which, as previously pointed out, is a function of the moisture content of the thread. This cycle may take, for example, ten seconds with a normal moisture content.

It will be evident from the above that, by counting the number of charges and discharges over a predetermined period of time, an integrated value of the moisture content over that interval may be obtained. Also, by timing the rate of charge of the condenser 103, an instantaneous value of the moisture content will be obtained. This is accomplished by the remainder of the circuit of Figure 7 to be described.

A step-by-step relay 130 is provided with a ratchet 131 actuated by an armature 132 and a relay coil 133 which is shunted by a condenser 134. The ratchet mechanism drives a rotor 135 having a plurality of bosses 136 thereon which are adapted to actuate a switch arm 137. In one position, the switch arm 137 closes contacts 138 and 139, and in the other position contacts contact 140. The ratchet mechanism 131 is so designed that two operations of the ratchet are required to shift the rotor 135 from the position in which one boss 136 actuates the arm 137 to a position in which the arm 137 has been released and again actuated by the next boss 136. Such a step-by-step relay may be of any standard construction.

A counter 145 is provided with an actuating coil 146 which actuates the counter register 147 and with a reset button 148 which is normally held outward by a spring 149, but is pushed inwardly against the force of the spring 149 to reset the counter. The reset button 148 actuates an arm 150 which normally closes a contact 151 but automatically opens the contact 151 when the knob 148 is pressed inwardly for resetting the counter.

A timer 155 is provided, which is similar to the timer shown in Figures 1 to 6, with the cam 60, brake shoe 50, and switch 35 omitted. The timer 155 comprises the usual clock motor operated by a coil 156 and a clutch coil 157 which is similar to the coil 31 of the timer illustrated in Figures 1 to 6, and controls the operation of the driving arm. The timer contact 158, carried by a contact arm, is normally closed but is arranged to be opened when the driving arm of the timer engages the contact arm. The contact arm in this case is pre-set for the time it is desired for the timer to operate.

A line 165 is connected by a line 166 to the supply line 80. This line is connected through a high speed switch 167 to the relay coil 111, the return connection being grounded. The high speed switch 167 constitutes a centrifugal switch which is arranged to be closed when the slasher is operating at normal speed but to be opened when the slasher has been stopped. Hence, the relay coil 111 is energized during such times as the slasher may be running. Energization of the coil 111 closes the contact 109, as previously described, to supply current to the slasher rolls 106 and 116. It also closes arm 168 against contact 169. Actuation of the switch 167 also closes the circuit to clock coil 156 through a line 170. Hence, the clock motor 156 likewise operates only during the time that the slasher is running. Test jack 171 is connected across the switch 167 to permit the system to be checked when the slasher is stopped and the switch 167 is open.

The armature 121 of the relay coil 120 actuates arm 172 to close a contact 173. The contact 173 is connected by a line 174 to a variable resistor 175, thence by a line 176 to one side of the relay coil 133. The other side of the relay coil 133 is connected by line 177 to the supply line 165. Hence, the relay coil 133 is energized once each time the coil 120 is operated and the contact 139 is closed at every other operation of the coil 120.

The arm 137 of the ratchet relay is connected by a line 180 to the supply line 165. The contact 138 is connected by a line 181 to the counter coil 146, thence by a line 182 to the normally closed contact 158 of the timer 155. The arm 159 of the timer 155 is connected by a line 183 to the normally closed contact 151 of the counter, the arm 150 of which is grounded by a line 184. Hence, closing of the contact 138 completes the circuit through the counter coil 146 provided the contacts 158 and 151 are closed and causes the counter coil 146 to register every other actuation of the coil 120.

When the timer 155 has operated a sufficient period of time for its driver arm to engage the contact arm and open the contact 158, the counter coil 146 is de-energized and no further actuations of the coil 120 are registered on the counter register 147. The register then indicates half the total number of actuations of the coil 120, which in turn represents half the total number of charges applied to the condenser 103 during the timed period. By referring to a suitable chart, the integrated moisture content for the period may be noted. This period may, for example, represent the normal running time of a slasher beam, for example 2 hours.

After the reading of the counter 145 has been noted or when a new slasher beam is placed on the machine, the device may be reset by pushing the reset button 148, thereby resetting the counter register 147 and opening the contact 151. Opening the contact 151 breaks the circuit through the clutch coil 157 of the timer and causes the timer to be reset to zero. When the reset button 148 is released, contact 151 is again closed and the counter is ready for another cycle of operation.

For timing the interval between every other actuation of the coil 120, a second timer 190 is employed which is of the type shown in Figures 1 to 6, and previously described. This timer comprises the clock motor coil 10 which is connected by a line 191 to switch 192 and by line 193 to the arm 168 of the relay 110, and thence through contact 169 of the relay 110 to ground. The other end of the clock coil 10 is connected by line 194 to a normally closed contact 195 of a relay 196 having an actuating coil 197. The contact 195 engages an arm 198 which is connected by a line 199 to the supply line 165. Hence, the clock coil is energized through the back contact 195 whenever the relay 196 is de-energized and the relay 110 is energized, which is the normal operating condition. The contact 195 is also connected by a line 200 and line 201 to the clutch coil 31 of the timer 190 and through lines 200 and 202 to the contact 140 of the ratchet relay 130. It will be noted that the clutch coil 31 and the clock coil 10 are normally supplied through the contact 195 when the latter is closed. However, when the contact 195 is opened and the contact 140 is closed, the above coils are supplied through the contact 140.

Contact 138 is connected by a lead 203 to an arm 204 of the relay 196 which normally engages contact 205. The contact 205 is connected by a line 206 to the brake release coil 54 of the timer 190.

Contacts 63 and 64 of the timer 190 are connected by lines 207 and 208 to control lines 20 and 210 respectively and to a pair of signal lights 211 and 212 respectively. The signal lights 211 and 212 are shown as connected through a variable resistor 213 and line 214 to the supply line 165.

The microswitch 35 is provided with a contact 220 which is connected by a line 221 to a contact 222 which engages the arm 198 when the relay 196 is actuated. The coil 197 of the relay 196 is connected by a line 223 to the contacts 41 and thence by a lead 224 to the arm 225 of the microswitch.

The operation of the timer 190 is as follows: The clock motor 10 of the timer 190 is energized whenever the relay coil 111 is energized and contact 140 is closed, that is whenever the slasher is running. Hence, the clock operates to advance the driving arm 22 (Figure 1) whenever the slasher is running and contact 140 is closed and the clutch coil 31 is energized.

With the relay 197 de-energized, the clock motor 10 and the clutch coil 31 are supplied through the contact 195 as above described. When the ratchet relay 130 is advanced to close the contact 140, the clock motor coil 10 and clutch coil 31 are energized through the contact 140 regardless of whether or not the contact 195 has meanwhile opened.

When the ratchet relay has advanced one step to again open the contact 140 and close the contact 138, the brake release coil 54 is energized through the contact 138 and the contact 205 of the relay 196, thereby elevating the brake shoe 50 and allowing the contact arm 40 to be returned in a counterclockwise direction by the action of the spring 42 until it engages the driving arm 22, thereby momentarily closing the contact 41. Closing the contact 41 energizes the relay 196, thereby opening the contact 205 and de-energizing the coil 54 to allow the brake shoe 50 to again engage the brake member 47 and hold the arm 40 in its then position. Actuation of the relay also opens the contact 195 and closes the contact 222. Opening the contact 195 interrupts the circuit through the clock motor 10 and through the clutch coil 31, thereby releasing the clutch coil and allowing the arm 22 of the timer 190 to be returned to zero position by the spring 23. Movement of the arm 22 away from the contact arm 40 allows the contacts 41 to again open. At the same time, release of the coil 31 closes the microswitch 35 which acts as holding contact on the relay 196 to hold the same in actuated position. It will be noted that the pointer 45 is now held at a position which corresponds to the maximum clockwise position of the driving arm 22 before the timer was reset.

At the next step of the ratchet relay 130, contact 140 is closed thereby again energizing the clock motor 10 and the clutch coil 31. Energization of the clutch coil 31 breaks the contact of the microswitch 35 and releases the relay 196.

It will be noted that if the succeeding cycle being timed is longer than the previous cycle, the contact 41 will close due to the driving arm 22 engaging the contact arm 40 before the contact 138 is closed by the ratchet relay. As soon as the contacts 41 close the relay 196 operates, breaking the circuit to the brake release coil 54. Hence, the brake shoe is not elevated and the indicator arm 40 retains its new position when the driving arm 22 is reset. If, however, the subsequent time period is shorter, the contact 138 closes first, thereby releasing the indicator arm 40 and allowing the same to drop against the driver arm 22, as above described. Hence, the indicator arm 40 always indicates the length of the last cycle or the time required for the next to the last charge of the condenser 103, and the pointer 45 gives an indication of the instantaneous value of the moisture content for this cycle.

The cam 60 and the contacts 63 and 64 may be used to actuate a control system when this moisture content exceeds or is reduced below a predetermined value, or the pilot lights 211 and 212 may be selectively actuated to indicate that the moisture content has risen too high or fallen too low. Thereupon, suitable control may be effected by the operator.

A specific embodiment of the invention has been shown for purposes of illustration only, and it is to be understood that the invention may be applied to various uses and that changes and adaptations may be made therein as will be readily apparent to a person skilled in the art. The invention has been described specifically as applied to a slasher. The web 126 may, however, constitute any flexible non-conducting web, the moisture content of which is to be measured, such as a cellophane web or other cellulosic or fibrous material.

Since it is obvious that many changes and modifications can be made in the above-described details without departing from the nature and spirit of the invention, it is to be understood that the invention is not to be limited thereto except as set forth in the appended claims.

I claim:

1. An impulse timer comprising a driving arm, timed drive means for said arm, connections including a clutch to connect said arm to be driven by said drive means, spring means to reset said arm when said clutch is released, a contact arm driven by said driving arm and having a contact actuated by contact with said driving arm, a brake to hold said contact arm in position, spring means to reset said last arm when said brake is released, and electromagnetic means actuating said clutch and said brake.

2. An impulse timer comprising a driving arm, timed drive means for said arm, connections including a clutch to connect said arm to be driven by said drive means, spring means to reset said arm when said clutch is released, a contact arm driven by said driving arm and having a contact actuated by contact with said driving arm, a brake to hold said contact arm in position, spring means to reset said last arm when said brake is released, electromagnetic means actuating said clutch and said brake, cam means on said contact arm, and contacts selectively closed by said cam means in different positions thereof.

3. An impulse timer comprising a driving arm, timed drive means for said arm, connections including a clutch to connect said arm to be driven by said drive means, spring means to reset said arm when said clutch is released, a contact arm driven by said driving arm and having a contact actuated by contact with said driving arm, a brake to hold said contact arm in position, spring means to reset said last arm when said brake is released, electromagnetic means actuating said clutch and said brake, a switch having an operating lever, and means on said brake to actuate said lever.

JOHN S. SENEY.

REFERENCES CITED

The following references are of record in the file of this patent:

UNITED STATES PATENTS

| Number | Name | Date |
|---|---|---|
| 2,130,405 | Andrews | Sept. 20, 1938 |